July 24, 1951  C. G. HADLEY ET AL  2,561,470
ROTARY CUTTER HEAD WITH RESILIENT BLADE CLAMPING MEANS
Filed April 4, 1947
Fig. 1.
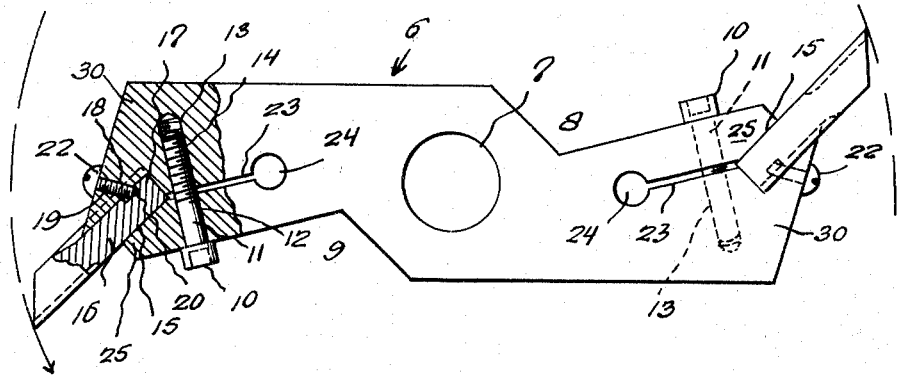
Fig. 2.
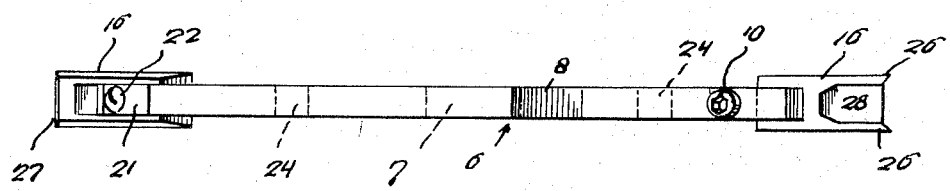
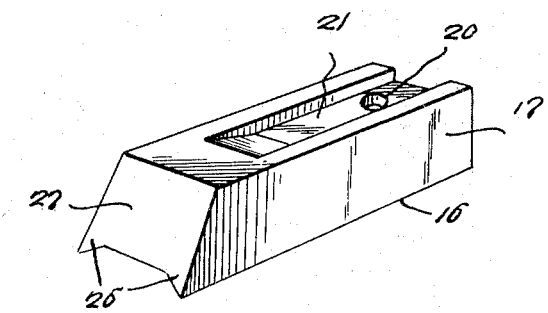
Fig. 3.
Fig. 4.
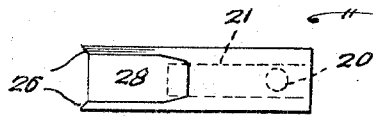
Inventors
James A. Snodgrass,
Charles Grant Hadley,
By McMorrow, Berman & Davidson
Attorneys Patented July 24, 1951

2,561,470

UNITED STATES PATENT OFFICE 2,561,470

ROTARY CUTTER HEAD WITH RESILIENT BLADE CLAMPING MEANS

Charles G. Hadley and James A. Snodgrass, La Mesa, Calif.

Application April 4, 1947, Serial No. 739,378

1 Claim. (Cl. 144—229)

Our invention relates to an improvement in cutter heads for use on the spindles of circular saws and the like.

It is a principal object of our invention to provide an improved dado head for a circular saw spindle which insures perfect alignment of the cutters.

It is an important object of our invention to provide such a dado head of simple design in which interchangeable blades are held securely and in alignment in axially parallel recesses at the diagonal corners of a rhomboidal shaped head.

It is a further object of our invention to provide a device of the character described which is simple in structure, convenient to use, and efficient in service.

Other objects and advantages of our invention will become apparent during the course of the following specification, and accompanying drawings, forming part of the specification, in which like numerals are used to designate like parts throughout.

In the drawings:

Figure 1 is a side elevation, partly in section, of our cutter head shown engaging a pair of cutting knives.

Figure 2 is a plan view of the same.

Figure 3 is a perspective view of a plow knife adapted for use in our cutter head, and Figure 4 is a plan view of the plow knife.

Referring now in detail to the drawings, the numeral 6 denotes generally the cutter head of our invention. It consists of a planiform metal member of suitable thickness and of a general rhomboidal shape, and is provided with a body having a central opening 7 for mounting the said head for rotation upon a spindle driven by a suitable source of power and a pair of arms extending from the body in opposite directions.

Portions of the opposite longitudinal edges of such arms are cut away to form the re-entrant recesses 8 and 9 on the opposite sides thereof in which clearance is provided for the heads 10 of clamp screws 11.

The outer or free end of each of the arms is provided with an angularly disposed socket 15 extending inwardly thereof. Extending longitudinally inwardly from the socket 15 between the longitudinal edges in each arm and located nearer one longitudinal edge than the other longitudinal edge of the adjacent arm is a rectangular shaped slot 23, the slot 23 terminating in an enlargement in the form of a circular enlargement. The slot 23 and enlargement 24 in each arm divide the outer end arm portion into a resiliently movable jaw 25 and a stationary jaw 30. The clamp screws 11 are disposed in aligned bores 12 and 13 formed respectively in the movable and stationary jaws 25 and 30.

A tool or cutter 16 is adapted to be slidably received in each socket 15 and to be clamped therein by the action of the clamp screws 11 in a well known manner. Each cutter 16 includes a jaw engaging surface in the form of a channel 21 which is slidable complementary to the jaw surface with which it is adapted to engage. In the embodiment illustrated, the channel 21 is complementary to the abutting jaw surface of the stationary jaw 30. Likewise, each channel 21 includes a floor formed with a recess 20 facing the opposed jaw. In like manner, such opposed jaw is provided with a set screw seatable in the recess whereby to retain the cutter 16 in the socket. The side walls of the channel 21 engage opposite side surfaces of the jaw 30 whereby to maintain the cutter longitudinally aligned with the arms of the cutter head thereof.

Thus, the clamping action of the jaws maintains the tool steadily in the sockets 15 against chattering, the channels 21 maintain the cutters aligned and prevent lateral play thereof, while the set screws 22 prevent the cutters from working forwardly in the sockets 15.

The cutter 16 may be of any suitable form and the surfaces 27 thereof may be recessed as shown to provide laterally spaced cutting lips 26, and a subjacent recess 28.

Having thus described our invention, we claim:

A rotary cutter head comprising a body adapted to be secured to a spindle, a pair of arms extending from said body in opposite directions, each of said arms including a free end provided with an angularly disposed socket extending inwardly thereof for the reception of a cutter therein, there being a rectangular shaped slot extending longitudinally inwardly from the socket in each of said arms between the longitudinal edges thereof and located nearer one longitudinal edge than the other longitudinal edge of the adjacent arm and terminating in an enlargement, the slot and enlargement in each arm dividing the free end arm portion into a stationary jaw and a resiliently movable jaw, a cutter slidable in each socket, each cutter being formed with a channel complementary to a stationary jaw and slidably receiving said jaw therein, said channel including a floor formed with a recess facing said stationary jaw, a set screw threaded in said stationary jaw and seatable in said recess, and means for moving said movable jaws to clamp said cutters against said stationary jaws.

CHARLES G. HADLEY.
JAMES A. SNODGRASS.

REFERENCES CITED

The following references are of record in the file of this patent:

UNITED STATES PATENTS

| Number | Name | Date |
|---|---|---|
| 345,662 | Blaney | July 20, 1886 |
| 932,576 | Ramsey | Aug. 31, 1909 |
| 987,479 | Mitchell | Mar. 21, 1911 |
| 1,097,818 | Packewitz et al. | May 26, 1914 |
| 1,130,913 | Madson | Mar. 9, 1915 |